United States Patent [19]

Schulte

[11] 4,219,223

[45] Aug. 26, 1980

[54] UNDERWATER MULTIPLE HYDRAULIC LINE CONNECTOR

[75] Inventor: Clarence A. Schulte, Crosby, Tex.

[73] Assignee: Vetco Inc., Ventura, Calif.

[21] Appl. No.: 959,270

[22] Filed: Nov. 9, 1978

[51] Int. Cl.² .................................................. F16L 35/00
[52] U.S. Cl. ...................................... 285/26; 285/131; 285/315; 285/DIG. 21
[58] Field of Search ................. 285/137 A, 137 R, 25, 285/26, 28, 29, 315, 131, 132, 322, 323, 145, DIG. 21; 137/594; 166/338, 344

[56] References Cited

U.S. PATENT DOCUMENTS

| | | | |
|---|---|---|---|
| 3,321,217 | 5/1967 | Ahlsone | 285/18 |
| 3,452,815 | 7/1969 | Watkins | 166/344 |
| 3,486,556 | 12/1969 | Burgess | 166/338 |
| 3,817,281 | 6/1974 | Lewis | 285/26 |
| 3,840,071 | 10/1974 | Baugh et al. | 285/26 X |

FOREIGN PATENT DOCUMENTS 517746 7/1976 U.S.S.R. ............................... 285/137 R

*Primary Examiner*—Dave W. Arola
*Attorney, Agent, or Firm*—Edward L. Kochey, Jr.

[57] ABSTRACT

A hub mounted on a wellhead has hydraulic control line openings around its outer periphery. A body containing control lines to be connected to the hub carries a plurality of dogs arranged within the body to annularly surround the hub. These dogs are cammed into sealing and locking arrangement with the hub and have openings which align with the hub openings and are connected to the body with flexible tubing.

6 Claims, 2 Drawing Figures

UNDERWATER MULTIPLE HYDRAULIC LINE CONNECTOR

BACKGROUND OF THE INVENTION

This invention relates to hydraulic control line connections and in particular to remote connections for subsea use.

In offshore drilling and production operations, a plurality of tool and valve actuators are relatively permanently installed at or below the wellhead. These are hydraulically operated and require hydraulic control lines to be connected so that the operations may be controlled from the surface. It is, therefore, necessary to have a means for connecting a plurality of control lines to the wellhead with retrievable equipment and preferably in a manner which does not require diver assistance.

Such connections have generally been made with either a pin-type stab connection or a packer-type stab connection. In the pin-type stab connection one pin is used for each hydraulic connection so that a plurality of pins must be stabbed simultaneously. These arrangements have difficulty in connecting or disconnecting with even slight angular misalignments and are difficult to unlock rapidly in an emergency. These arrangements are very expensive and require large forces to energize the seals.

In the stringer arrangement it is difficult to provide substantial sealing forces, and there tends to be a sliding of the seals as they are connected, thereby deteriorating the sealing surfaces.

SUMMARY OF THE INVENTION

It is an object of the invention to connect a removable body containing a plurality of control lines to a hub containing a plurality of control lines without sliding of the seal surface and by a means which provides a high sealing force.

It is a further object to make such a connection in a method which allows some initial angular misalignment.

It is a further object to provide a connection which is secure but which may be rapidly disconnected. These and other objects are accomplished by the below-described invention.

The lower portion of the hydraulic control pod connector is a cylindrical hub which is installed on the wellhead and to which permanent hydraulic connections run to various control apparatus. The hub has a plurality of radially directed hub openings in fluid communication with the control lines.

A generally cylindrical body may be lowered from the surface to which are attached hydraulic lines from the surface with the body including openings in fluid communication with the hydraulic connections. A plurality of dogs are annularly arranged and radially movable within the body, and the dogs have openings which are alignable with corresponding openings in the hub. Flexible tubes are connected between the body and each of the dogs so that hydraulic pressure may be communicated from the surface to the hydraulically-operated apparatus when the dogs are pressed against the hub. A cam for moving the dogs radially into engagement with the hub and drive means for moving the cams are located within the body.

Removable seals are mounted on the dogs surrounding the openings so that the seals may readily be replaced since they are located on the piece of equipment which is more easily retrievable. The hub has a radially extending recess while the dogs have a corresponding radially extending lip adapted to engage the recess so that when the body and hub are sealingly engaged they are also locked in place.

DESCRIPTION OF THE PREFERRED EMBODIMENT

Figure 1:
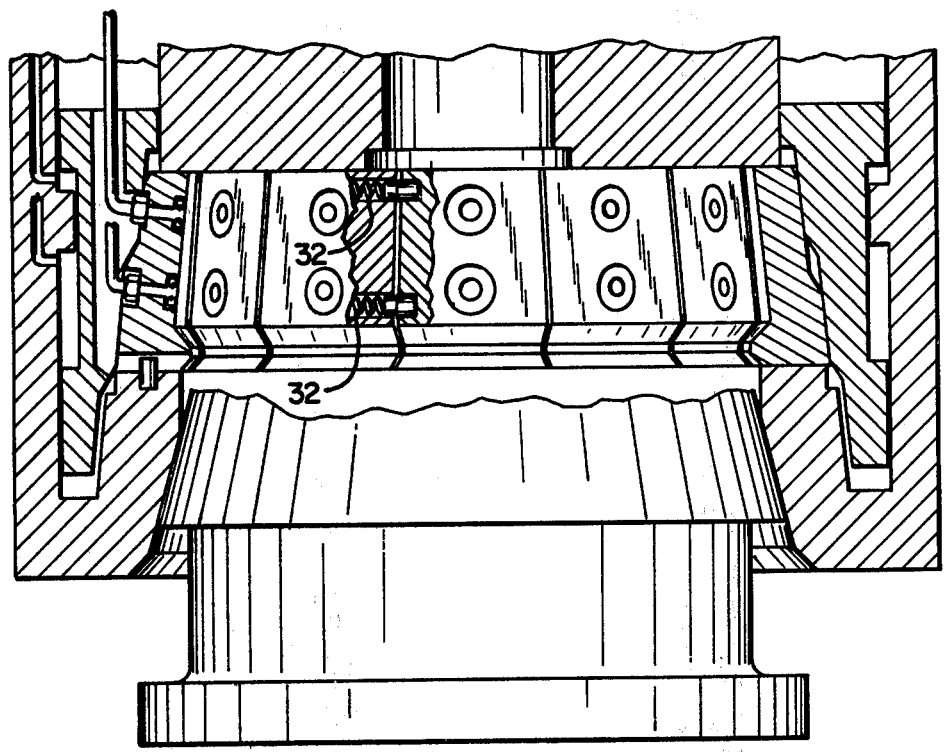
FIG. 1 is a partial sectional elevation through the body illustrating the arrangement of the dogs.

A generally cylindrical hub 10 is mounted on a wellhead and includes threaded openings 12 as means for attaching permanent hub hydraulic connections. These hydraulic connections are used to operate various valves and tools during well drilling or production. The hub includes on its outer periphery a plurality of openings 14 in fluid communication with the threaded openings 12. A generally cylindrical body 16 is comprised of an upper body 18, an outer body 20, and a lower body 22. Fittings 24 provide a means for attaching permanent body hydraulic connections, and the control lines running to the surface are attached at this point. The body has openings 26 in fluid communication with these control lines. A control assembly 28 is mounted on the body with a plurality of control lines running to the surface.

A plurality of dogs 30 are annularly arranged and radially movable within the body. There is clearance between the adjacent dogs, and springs 32 are maintained in compression to urge the dogs outwardly. For convenience of manufacture, the inner surface of the dogs are planular while the outer periphery of the hub is cylindrical. This is possible by use of special seal rings 34 which are curved at the surface facing the hub and planular on the opposite surface. It is, of course, possible to form the hub of a plurality of plane surface or to form the dogs with curved surfaces matching the hub.

The dogs 30 have openings 36 therethrough which are alignable with corresponding hub openings 14. A flexible tube 38 is connected to the body and to each of the dogs in fluid communication between the body openings 26 and the dog openings 36. It can be seen that when the dogs are pressed against the hub, complete hydraulic circuits are effected from the surface to the control apparatus connected to the hub.

A cam 40 is located within the body and surrounds the plurality of dogs. This cam is in the form of a ring, having openings thru which tubes 38 may pass. It could alternately be formed of a plurality of segments, with the tubes passing between segments.

An actuator sleeve 41 in the form of a ring is fastened to the cam 40 by actuator sleeve retainer 42. Components 40, 41, and 42 thereby function together as a cam structure. The outer surface of the cam structure is vertical and is sealed against the body by seals 43, 44, and 46. Hydraulic fluid passing through the opening 48 through the body passes to chamber 50 between seals 43 and 44. Hydraulic pressure at this location operates to move the cam upwardly out of engagement with the dogs. Alternately fluid through other openings, not shown, will operate to impose pressure in chamber 52 between seals 44 and 46, and thereby operate to move the cam downwardly into engagement with the dogs.

Because of the angle of the camming surface, it can be seen that substantial compressive force may be obtained on the seals 34 to effect fluid-type connections. While it is judicious to maintain the pressure in chamber 52, it is not necessary since the cam will not move upwardly under reaction forces from this seal.

The dogs 30 include a radially inwardly extending lip 54 which are adapted to engage recesses 56 in the hub. The upper surface of the lip and the corresponding surface of the recess are preferably at an angle of between 30 and 60 degrees from the horizontal with 45 degrees used in the illustrated embodiment. As the lip engages the recess, it will pull the body into alignment should there be initial misalignment. It will, furthermore, pull the body down until the lower surface of the upper body 18 and the upper surface of the hub 10 are in near contact. Sufficient clearance should, however, be left between the lip and the recess to preclude final engagement at this point prior to complete energization of the seal. Accordingly, some slight clearance between the lip and recess should be maintained. The closer to horizontal the upper surface of the lip, the less problem could occur with locking at the lip prior to energization of this seal. Such a radical angle is not recommended, however, in order to obtain some security on disengagement of the apparatus. Should the cam be withdrawn and the springs between the dogs 30 have insufficient force to withdraw the dogs, the body may be released by a vertical pull since the interaction between the lip and the recess will tend to move the dogs outwardly. The further the angle is from the horizontal, the more efficacious this operation will be. Accordingly, the range described above is the preferable compromise.

Vertical rods 58 are attached to the cam 40 extending upwardly where they are fastened to running and retrieving hub 60. The pod connector is supported by this hub during lowering and raising operations. During a retrieval operation the lifting force operates on the cam and supplements the hydraulic cam release force.

It is noted that even though the lip may not be in complete contact with the hub, it operates to prevent accidental disengagement of the body from hub. This is accomplished simultaneously when energizing the seals.

Figure 2:
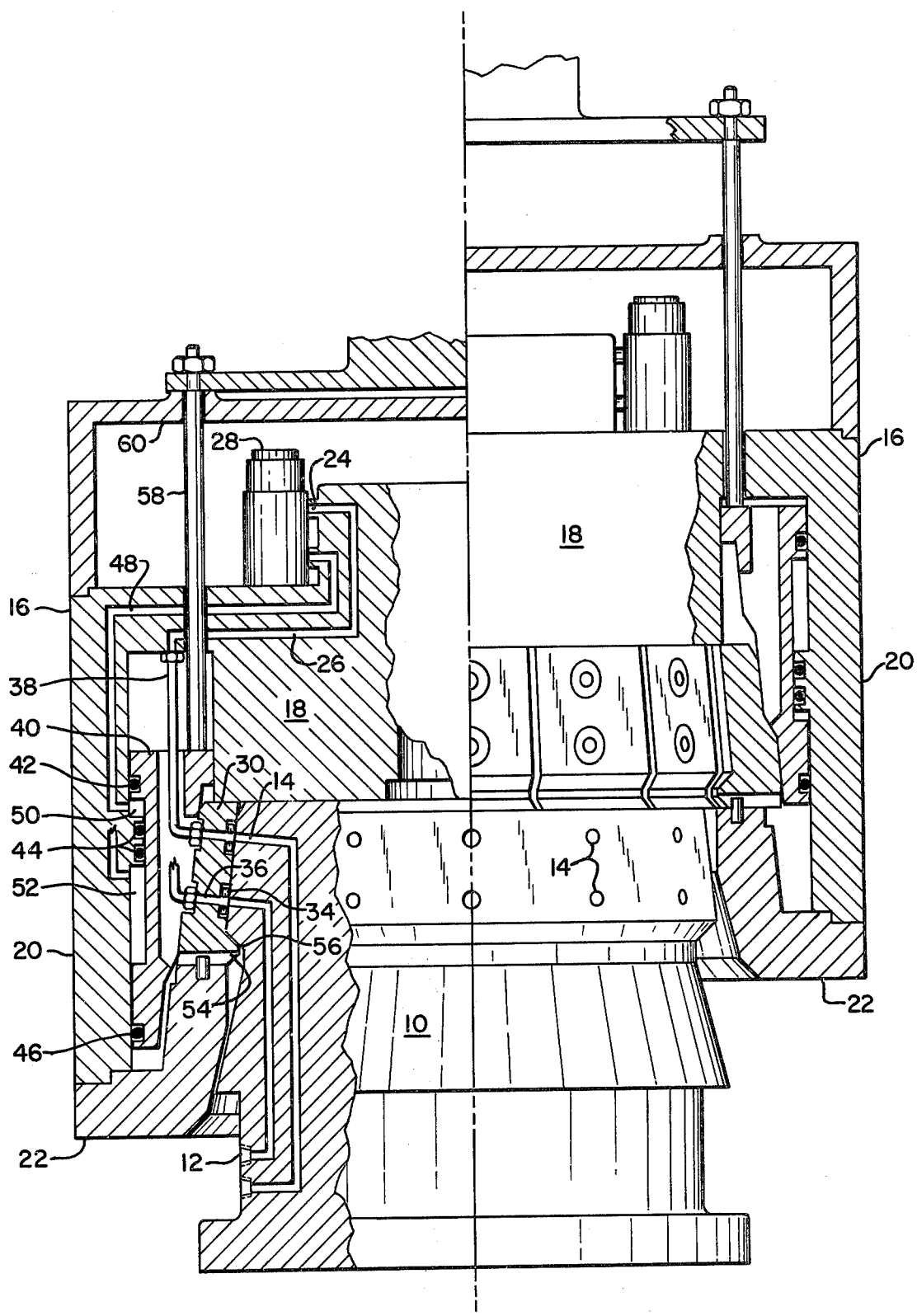
FIG. 2 is a split sectional elevation with the left side illustrating the hub and body in engaged position while the right side illustrates them in a disengaged position.

The right hand of FIG. 2 illustrates the cam in an unlatched condition with the dogs retracted. The body has at this point been lowered until the upper body 18 of the body contacts the hub 10. Introduction of hydraulic pressure into chamber 52 moves the cam downwardly to the position illustrated on the left side of FIG. 2 which then forces the dogs inwardly effecting the seal and the locking arrangement of the invention.

What is claimed is:

1. A hydraulic control pod connector comprising: a generally cylindrical hub, having means for attaching permanent hub hydraulic connections, and a plurality of radially directed hub openings in fluid communication with said means for attaching the permanent hub hydraulic connections; a generally cylindrical body, having means for attaching permanent body hydraulic connections, and body openings in fluid communication therewith; a plurality of dogs annularly arranged and radially movable within said body, said dogs having dog openings therethrough alignable and sealable with corresponding radially directed hub openings; flexible tubes connected to said body and each of said dogs in fluid communication between said body openings and said dog openings; a cam means for moving said dogs radially into engagement with said hub; and drive means for moving said cam into and out of engagement with said dogs.

2. An apparatus as in claim 1: wherein said hub is a male member having said hub openings on the outer periphery thereof; and said body is a female member annularly surrounding said hub.

3. An apparatus as in claim 1 or 2: having also removable seals mounted on said dogs and surrounding each of said dog openings.

4. An apparatus as in claim 1 or 2: wherein said hub also has a radially extending recess; means for retaining said dogs within said body; and said dogs having radially extending lips adapted to engage said recess, whereby said dogs lock said body to said hub when the dogs are cammed into sealing arrangement with the hub.

5. An apparatus as in claim 4: wherein said hub and said body have a vertical axis and wherein the upper surface of the lip and the corresponding engaging surface of the recess have an angle with respect to the horizontal of greater than 30 degrees.

6. An apparatus as in claim 5: wherein the upper surface of the lip and the corresponding engaging surface of the recess have an angle with respect to the horizontal of less than 60 degrees.

* * * * *